United States Patent
DeMeritt et al.

(10) Patent No.: US 9,557,488 B2
(45) Date of Patent: Jan. 31, 2017

(54) OPTICAL CONNECTOR WITH LENSES HAVING OPPOSING ANGLED PLANAR SURFACES

(75) Inventors: Jeffery Alan DeMeritt, Painted Post, NY (US); Davide Domenico Fortusini, Ithaca, NY (US); James Scott Sutherland, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 533 days.

(21) Appl. No.: 13/346,210

(22) Filed: Jan. 9, 2012

(65) Prior Publication Data

US 2012/0177327 A1    Jul. 12, 2012

Related U.S. Application Data

(60) Provisional application No. 61/431,517, filed on Jan. 11, 2011.

(51) Int. Cl.
G02B 6/32    (2006.01)
G02B 6/42    (2006.01)

(52) U.S. Cl.
CPC ............. *G02B 6/327* (2013.01); *G02B 6/4214* (2013.01); *G02B 6/4204* (2013.01); *G02B 6/4207* (2013.01); *Y10T 29/49826* (2015.01)

(58) Field of Classification Search
CPC ..... G02B 6/327; G02B 6/4214; G02B 6/4204; G02B 6/4207; Y10T 29/49826
See application file for complete search history.

(56) References Cited

U.S. PATENT DOCUMENTS

| | | | |
|---|---|---|---|
| 4,420,219 A | * | 12/1983 | Muchel ........................ 385/74 |
| 4,526,467 A | | 7/1985 | Fantone |
| 4,616,900 A | | 10/1986 | Cairns |

(Continued)

FOREIGN PATENT DOCUMENTS

| | | |
|---|---|---|
| CN | 1407740 A | 4/2003 |
| CN | 101535862 A | 9/2009 |

(Continued)

OTHER PUBLICATIONS

Chinese Office Action and Search Report for Application No. 201280005043.8, dated Nov. 24, 2015, 5 pages.

(Continued)

*Primary Examiner* — John M Bedtelyon

(57) ABSTRACT

An optical connector for optically connecting at least one light source to at least one light receiver is disclosed. The optical connector includes first and second connector members respectively having first and second positive-power lens elements with respective first and second planar lens surfaces. The lens elements are arranged in their respective connector members such that when the two connector members are operably mated, the first and second lenses form an optical system where the first and second planar lens surfaces are spaced apart in opposition with a narrow gap in between, and are non-perpendicular to the optical system axis. The lenses may be conventional uniform-refractive-index lenses having a convex surface or may be gradient-index lenses having two planar surfaces. The optical connector is tolerant to contamination that can find its way into the narrow gap.

31 Claims, 10 Drawing Sheets

(56) References Cited

U.S. PATENT DOCUMENTS

| | | | |
|---|---|---|---|
| 4,636,030 | A | 1/1987 | Carter et al. |
| 4,718,744 | A * | 1/1988 | Manning .................. G02B 6/32 385/79 |
| 4,787,700 | A | 11/1988 | Yin |
| 4,802,726 | A | 2/1989 | Palmquist et al. |
| 4,893,889 | A | 1/1990 | Iwakiri et al. |
| 5,026,131 | A | 6/1991 | Jannson et al. |
| 5,172,271 | A | 12/1992 | Sinclair |
| 5,214,730 | A | 5/1993 | Nagasawa et al. |
| 5,805,749 | A | 9/1998 | Sato |
| 5,832,153 | A | 11/1998 | Duck |
| 6,012,852 | A * | 1/2000 | Kadar-Kallen .......... G02B 6/32 385/74 |
| 6,253,007 | B1 * | 6/2001 | Laughlin ................. G02B 6/266 385/33 |
| 6,393,179 | B1 | 5/2002 | Cheng et al. |
| 6,782,162 | B2 | 8/2004 | Fukuzawa et al. |
| 7,771,129 | B2 | 8/2010 | Ishida et al. |
| 8,182,159 | B2 * | 5/2012 | Tanaka ............................ 385/74 |
| 2002/0064191 | A1 | 5/2002 | Capewell et al. |
| 2003/0063085 | A1 | 4/2003 | Huang et al. |
| 2003/0063853 | A1 * | 4/2003 | Huang et al. .................. 385/34 |
| 2009/0269009 | A1 | 10/2009 | Tanaka |
| 2010/0265983 | A1 | 10/2010 | Adachi et al. |
| 2011/0091156 | A1 | 4/2011 | Laughlin |

FOREIGN PATENT DOCUMENTS

| | | |
|---|---|---|
| EP | 53914 A1 | 6/1982 |
| EP | 0357132 A2 | 3/1990 |
| GB | 1537477 | 12/1978 |
| JP | 59034507 A | 2/1984 |
| WO | 0003276 A1 | 1/2000 |
| WO | 03076993 A1 | 9/2003 |
| WO | 2006008965 A1 | 1/2006 |

OTHER PUBLICATIONS

Patent Cooperation Treaty, International Search Report for PCT/US2012/020715, mail date Jul. 25, 2013, 9 pages.

International Search Report and Written Opinion issued in corresponding PCT Application No. PCT/US2012/020715, mailed Apr. 5, 2012.

TW Search Report for Application No. 101101139, dated May 13, 2015, 1 page.

* cited by examiner

OPTICAL CONNECTOR WITH LENSES HAVING OPPOSING ANGLED PLANAR SURFACES

CROSS-REFERENCE TO RELATED APPLICATIONS

This application claims the benefit of priority under 35 U.S.C. §119 of U.S. Provisional Application Ser. No. 61/431,517 filed on Jan. 11, 2011, the content of which is relied upon and incorporated herein by reference in its entirety.

FIELD

The disclosure is directed to optical connectors, and in particular relates to optical connectors with lenses having opposing angled planar surfaces.

BACKGROUND ART

Optical fiber is increasingly being used for a variety of applications, including but not limited to broadband voice, video, and data transmission. As consumer devices increasingly use more bandwidth, it is anticipated that connectors for these devices will move away from electrical connections and toward using optical connections or a combination of electrical and optical connections to meet the bandwidth needs.

Generally speaking, conventional optical connectors used for telecommunication networks and the like are not suitable for consumer electronic devices. For instance, conventional optical connectors are relatively large when compared with consumer devices and their interfaces. Additionally, conventional optical connectors need to be deployed with great care and into relatively clean environments, and generally need to be cleaned by the craft prior to connection. Such optical connectors are high-precision connectors designed for reducing insertion loss between mating connectors in the optical network. Further, though optical connectors used in telecommunications are reconfigurable (i.e., suitable for mating/unmating), they are not intended for the relatively large number of mating cycles normally associated with consumer electronic devices.

Besides operating with a relatively large number of mating/unmating cycles, consumer electronic devices are often used in environments where contaminants are ubiquitous. Consequently, an optical connector used for commercial electronic devices must be designed so that any contaminants (e.g., dust, dirt, debris, fluid, etc.) that find their way into the optical connector do not substantially reduce optical connector performance.

Further, the optical connector should be designed so that reflected light does not return to the light source, and so that multiple reflections do not cause interference effects that could impair the performance of the system. The impairing effects of optical reflections can be reduced by applying an anti-reflective coating to the surfaces in the optical path. However, such anti-reflective coatings increase the complexity and cost of the optical connector.

Another known method of reducing optical reflections is to provide an index-matching fluid between optical surfaces. However, the use of index-matching fluids is not practical in applications where a connector needs to be routinely disconnected and connected where the optical surfaces are interfaced. Therefore, it is desirable to have an optical connector that inherently suppresses adverse effects of optical reflections without using anti-reflective coatings or index-matching fluids.

Moreover, certain consumer electronic devices have size and space constraints for making connections and may not be amenable to a straight optical connection, so that an optical connector with a bend is also desirable.

SUMMARY

An aspect of the disclosure is an optical connector for optically connecting at least one light source to at least one light receiver. The optical connector includes first and second connector members respectively having first and second positive-power lens elements with respective first and second planar lens surfaces. The lens elements are arranged in their respective connector members such that when the two connector members are operably mated, the first and second lenses form an optical system where the first and second planar lens surfaces are spaced apart in opposition with a narrow gap in between, and are non-perpendicular to the optical system axis. The lenses may be conventional lenses with a convex surface or may be gradient-index lenses each having two planar surfaces. The optical connector is tolerant to contamination that can find its way into the narrow gap.

Another aspect of the disclosure is an optical connector for optically connecting a light source to a light receiver. The optical connector includes a first connector member having a first front section with a first front end, and includes a first lens arranged at the first front section, the first lens having a first axis, a first positive optical power and a first planar surface, with the first planar surface closest to the first front end. The optical connector also includes a second connector member having a second front section with a second front end, and includes a second lens arranged at the second front section, the second lens having a second axis, a second positive optical power and a second planar surface, with the second planar surface closest to the second front end. The optical connector is formed by matingly engaging the first and second front ends to form an optical system with an optical axis formed from the first and second axes, with the first and second planar surfaces being spaced apart in opposition and angled to be non-perpendicular to the optical system axis.

Another aspect of the disclosure is a method of forming an optical connection between at least one light source and at least one light receiver. The method includes connecting a first connector member to a second connector member, with the first connector member having at least one first lens with a first positive power and a first planar surface and the second connector member having at least one second lens with a second optical power and a second planar surface. Connecting the first and second connector members forms at least one optical system from the at least one first and at least one second lenses, with the first and second planar surfaces being spaced apart in opposition and angled to be non-perpendicular to a corresponding optical system axis. The method also includes passing light from the at least one light source to the at least one light receiver via the at least one optical system.

Another aspect of the disclosure is an optical connector for communicating light of an operating wavelength from a light source to a light receiver. The optical connector includes a first connector member having a first rear section and a first front section with a first front end, with a first lens disposed in the first front section, the first lens having a first positive optical power and a first planar surface adjacent the first front end, the first lens having a first focal plane and a first lens axis. The optical connector also includes a second connector member having a second rear section and a second front section with a second front end, with a second lens disposed in the second front section, the second lens having a second positive optical power and a second planar surface adjacent the second front end, the second lens having a second focal plane and a second lens axis. The first and second front sections are configured to matingly engage to form an optical system from the first and second lenses, wherein the optical system has an optical system axis defined by coaxial first and second lens axes, with the first and second planar surfaces being in opposition and spaced apart, and angled to be non-perpendicular to the optical axis.

Additional features and advantages will be set forth in the detailed description which follows, and in part will be readily apparent to those skilled in the art from that description or recognized by practicing the same as described herein, including the detailed description that follows, the claims, as well as the appended drawings.

It is to be understood that both the foregoing general description and the following detailed description present embodiments that are intended to provide an overview or framework for understanding the nature and character of the claims. The accompanying drawings are included to provide a further understanding of the disclosure, and are incorporated into and constitute a part of this specification. The drawings illustrate various embodiments and together with the description serve to explain the principles and operation.

DETAILED DESCRIPTION

Figure 1:
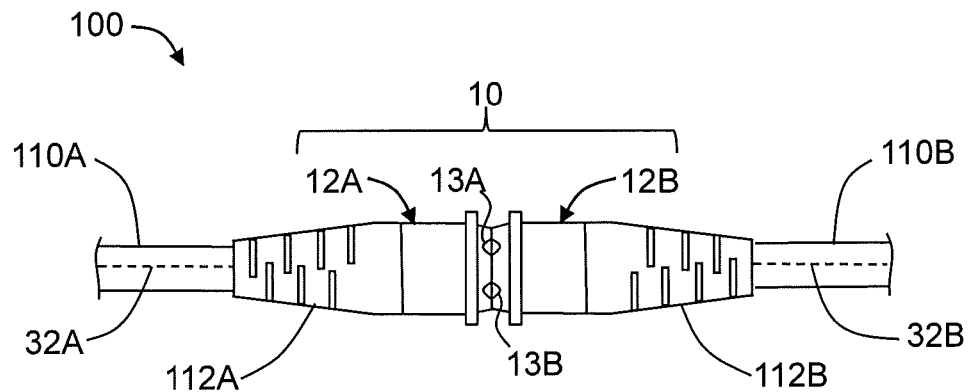
FIG. 1 is a side view of an example optical connector according to the disclosure.
Figure 2:
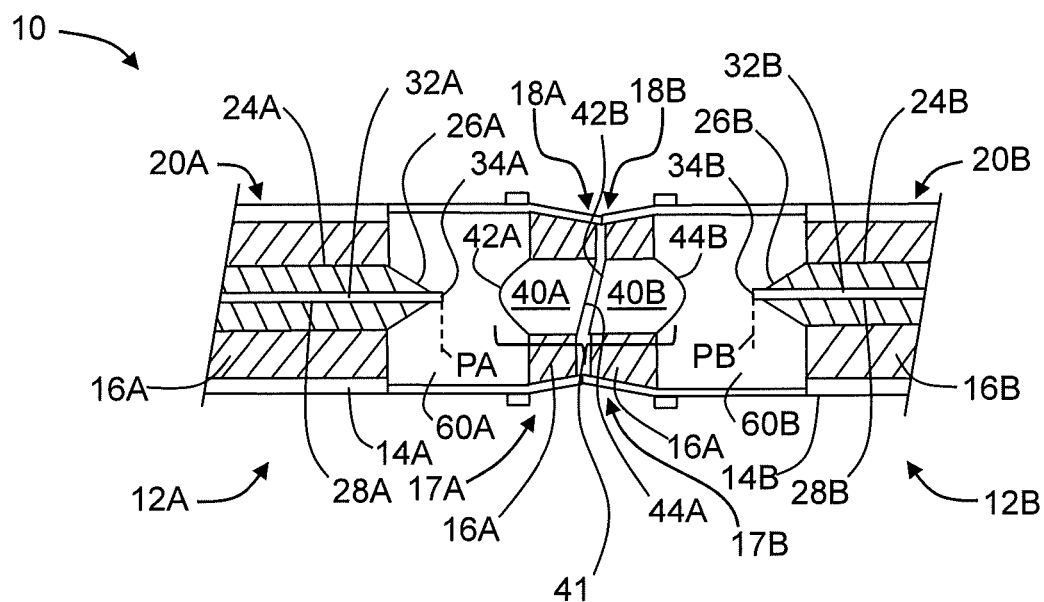
FIG. 2 is a close-up, longitudinal cross-sectional view of an example optical connector of the connector assembly of FIG. 1.

FIG. 1 is a side view of an example connector assembly 100 that includes an optical connector 10 according to the present disclosure. FIG. 2 is a close-up, longitudinal cross-sectional view of an example optical connector 10 of the connector assembly of FIG. 1. Optical connector 10 includes first and second mating connector members 12A and 12B having a similar (but not necessarily identical) structure. For ease of description, connector member 12A is referred to herein as "plug 12A" and connector member 12B is referred to as "receptacle 12B." Note that this terminology is a matter of choice and can be reversed. Also, in the Figures, light travels left to right unless indicated otherwise.

Connector assembly 100 includes plug and receptacle fiber optic cables 110A and 110B that are respectively connected to plug 12A and receptacle 12B of optical connector 10. Plug and receptacle fiber optic cables 110A and 110B respectively carry at least one plug optical fiber 32A and at least one receptacle optical fiber 32B. Connector assembly 100 includes respective strain-relief members ("boots") 112A and 112B that cover respective portions of the connector assembly where fiber optic cables 110A and 110B respectively interface with plug and receptacle 12A and 12B.

With reference to FIG. 2, plug 12A includes a plug housing 14A having a plug housing body 16A with a front section 17A having a front end 18A, and an opposite rear section 20A. Likewise, receptacle 12B includes a receptacle housing 14B having a receptacle housing body 16B with a front section 17B having a front end 18B, and an opposite rear section 20B. Plug and receptacle bodies 16A and 16B are configured to define respective plug and receptacle chambers 60A and 60B.

Plug 12A and receptacle 12B have their respective front sections 17A and 17B configured to matingly engage at their respective front ends 18A and 18B to establish optical communication between the plug and receptacle over one or more optical pathways, as described below.

In an example, plug and receptacle bodies 16A and 16B are configured to support, at their respective rear sections 20A and 20B, at least one plug ferrule 24A and at least one receptacle ferrule 24B. Plug and receptacle ferrules 24A and 24B have respective front ends 26A and 26B and respective central bores 28A and 28B. Ferrule central bores 28A and 28B are respectively sized to accommodate respective plug and receptacle optical fibers 32A and 32B, which having respective end faces 34A and 34B that respectively reside at or near ferrule front ends 26A and 26B. Plug and receptacle optical fibers 32A and 32B have respective longitudinal optical fiber axes AFA and AFB (see FIGS. 3 and 4). Longitudinal optical fiber axis AFA generally represents a light source axis and longitudinal optical fiber axis AFB generally represents a light receiver axis.

Likewise, plug and receptacle bodies 16A and 16B are respectively configured to support, at their respective front sections 17A and 17B, at least one plug lens 40A and at least one receptacle lens 40B. Plug and receptacle lenses 40A and 40B have respective focal planes PA and PB located at their respective rear sections 20A and 20B, e.g., at or near ferrule front ends 26A and 26B. Plug and receptacle lenses 40A and 40B also have respective lens axes AA and AB (see FIGS. 3 and 4). Plug and receptacle lenses 40A and 40B form an optical system 41 when plug 12A and receptacle 12B are mated to form optical connector 10. Focal planes PA and PB also serve as optical system focal planes.

As discussed below, focal planes PA and PB need not be parallel to each other when combined to form optical system 41. Also in an example, focal planes PA and PB generally represent best-focus locations for optical system 41 where light is generally concentrated, and do not necessarily represent locations where light is brought to a point-like focus. Focal planes PA and PB can thus be thought of as image planes of optical system 41 where a light source arranged at focal (image) plane PA is imaged onto a light receiver at focal (image) plane PB.

In an example, at least one of plug and receptacle lenses 40A and 40B consists of a single optical element, while in another example, at least one of the plug and receptacle lenses is formed from multiple optical elements.

In an example, plug and receptacle optical fibers 32A and 32B are respectively arranged in plug and receptacle ferrules 24A and 24B such that optical fiber end faces 34A and 34B extend from respective ferrule front ends 26A and 26B and into respective plug and receptacle chambers 60A and 60B. Thus, respective optical fiber end faces 34A and 34B of the plug and receptacle optical fibers 32A and 32B are spaced apart from respective plug and receptacle lenses 40A and 40B and are generally disposed at respective focal planes PA and PB. Thus, plug and receptacle optical fibers 32A and 32B, which generally represent a light source and a light receiver, are in optical communication with each other through respective plug and receptacle chambers 60A and 60B via the operation of optical system 41.

In an example, plug and receptacle chambers 60A and 60B are filled with air, while in other examples, the chambers are filled with another type of gas, or a solid or a fluid or gel-like dielectric material transparent to the operating wavelength of optical connector 10. Example operating wavelengths for optical connector 10 include one or more of the optical telecommunication wavelengths of 850 nm, 1310 nm and 1550 nm. Other example operating wavelengths include wavelengths associated with vertical-cavity surface-emitting lasers (VCSELS), such as 980 nm and 1060 nm, and 1300 nm and 1600 nm for silicon-based light sources. In an example, the operating wavelength of optical connector 10 is in the range from about 850 nm to about 1600 nm. Optical connector 10 may be operational at multiple operating wavelengths.

Figure 3:
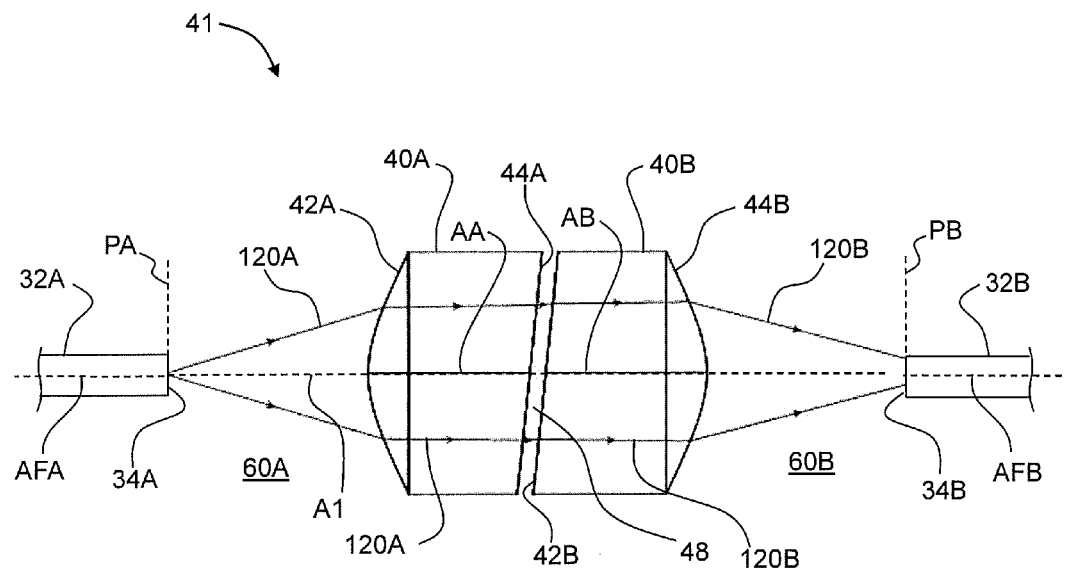
FIG. 3 is a close-up view of an example optical system of the optical connector of FIG. 2, also showing the plug and receptacle optical fibers with their respective ends arranged at respective focal planes of the plug and receptacle lenses, wherein the planar lens surfaces are parallel to each other but are not perpendicular to the optical system axis.

FIG. 3 is a close-up view of an optical system 41 along with plug and receptacle optical fibers 32A and 32B. When optical system 41 is formed via the mating connection of plug 12A and receptacle 12B, lens axes AA and AB of plug and receptacle lenses 40A and 40B are substantially coaxial and define a common optical system axis A1. Optical fiber end faces 34A and 34B of plug and receptacle optical fibers 32A and 32B reside substantially at respective focal planes PA and PB.

In an example, plug lens 40A includes a convex front surface 42A facing toward plug rear section 20A and a planar rear surface 44A at plug front end 18A. Receptacle lens 40B includes a planar front surface 42A at receptacle front end 18B and a convex rear surface 44B facing receptacle rear section 20B. Planar rear surface 44A of plug lens 40A and planar front surface 42A of receptacle lens 40B are opposing and spaced apart to define a gap 48 when plug 12A and receptacle 12B are matingly engaged at their respective front ends 18A and 18B to form optical connector 10. In an example, gap 48 has an axial width WA (see FIG. 7) of between 25 microns and 100 microns. Note that planar lens surfaces 44A and 42B can be considered external surfaces when optical connector 10 is disconnected, as these surfaces reside at respective plug and receptacle front ends 18A and 18B and are exposed when plug and receptacle 12A and 12B are disconnected.

Figure 4:
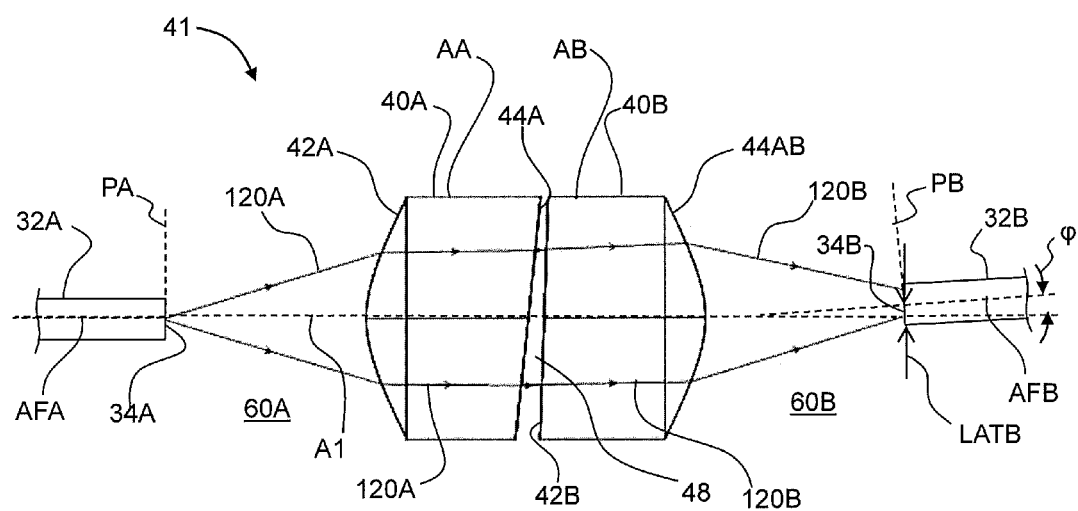
FIG. 4 is similar to FIG. 3 and illustrates an example embodiment of the optical system of the optical connector wherein planar lens surfaces are neither parallel to one another nor perpendicular to the optical system axis.

In an example, opposing planar lens surfaces 44A and 42B are angled with respect to optical system axis A1 (i.e., are not perpendicular thereto) and are parallel to one another. FIG. 4 is similar to FIG. 3 and illustrates an example embodiment of optical system 41 wherein opposing planar lens surfaces 44A and 42B are neither parallel to one another nor perpendicular to optical system axis A1.

Example materials for lenses 40A and 40B include Polyetheremide ((PEI), sold by the General Electric Company under the trademarked name ULTEM® 1010), PolyMethylMethacrylate, glass (including Gorilla® glass, a trademark of Corning, Inc., Corning, N.Y.), plastic, Silica/Germania glass, MethylMethacrylate with Benzyl Methacrylate, and combinations thereof as used by those skilled in the art of lens design. In an example discussed in greater detail below, at least one lens 40A and 40B is a gradient-index (GRIN) optical element, for which an exemplary material is the aforementioned Silica/Germania (e.g., Germanium-doped Silica) glass. Examples of optical connector 10 having at least one GRIN lens are discussed in greater detail below.

Example lens design parameters are set forth in Table 1 and Table 2, below. The examples presented in Tables 1 and 2 employ uniform-index refractive lenses. However, the disclosure is also applicable to other lens types, such as the aforementioned GRIN lenses. In Tables 1 and 2 below, the following abbreviations are used: Operating wavelength is $\lambda$, fiber core diameter is $D_C$ ($D_{CA}$, $D_{CB}$) fiber numerical apertures are $NA_A$ and $NA_B$, distance from fiber 32A to vertex of lens 40A is DVA, diameter of lenses 40A and 40B are DA and DB, axial gap width is WA, axial thickness of lenses 40A and 40B are THA and THB, distance from vertex of lens 40B to fiber 32B is DVB, lateral offset of optical fiber axis AFB of optical fiber 32B relative to optical axis A1 is LATB, relative angle of optical fiber axis AFB relative to optical system axis A1 is $\phi$, and refractive indices of lenses 40A and 40B are $n_A$ and $n_B$.

TABLE 1

Optical System example design parameters with θA = θB

| Parameter | Value/units |
|---|---|
| Λ | 850 nm |
| $D_{CA} = D_{CB}$ | 0.080 mm |
| $NA_A = NA_B$ | 0.29 |
| DVA | 0.500 mm |
| THA | 0.400 mm |
| DA = DB | 0.600 mm |
| WA | 0.040 mm |
| THA | 0.400 mm |
| DVB | 0.500 mm |
| LATB | 0 mm |
| Φ | 0.2 degrees |
| $n_A = n_B$ | 1.6395 |
| θA = θB | 3 degrees |
| Lens surface 42A prescription | Radius of curvature: 0.3865 mm<br>Conic constant: −3.9636<br>$2^{nd}$ order aspheric coefficient: 0.2410 mm$^{-2}$<br>$4^{th}$ order aspheric coefficient: −0.4297 mm$^{-4}$ |
| Lens surface 44B prescription | Radius of curvature: −0.3865 mm<br>Conic constant: −3.9636<br>$2^{nd}$ order aspheric coefficient: −0.2410 mm$^{-2}$<br>$4^{th}$ order aspheric coefficient: 0.4297 mm$^{-4}$ |

TABLE 2

Optical System example design parameters with θA ≠ θB

| Parameter | Value/units |
|---|---|
| Λ | 850 nm |
| $D_{CA} = D_{CB}$ | 0.080 mm |
| $NA_A = NA_B$ | 0.29 |
| DVA | 0.500 mm |
| THA | 0.400 mm |
| DA = DB | 0.600 mm |
| WA | 0.040 mm |
| THB | 0.400 mm |
| DVB | 0.500 mm |
| LATB | 0.020 mm |
| Φ | −1.1 degrees |
| $n_A = n_B$ | 1.6395 |
| θA, θB | 6 degrees, 3 degrees |
| Lens surface 42A prescription | Radius of curvature: 0.3865 mm<br>Conic constant: −3.9636<br>$2^{nd}$ order aspheric coefficient: 0.2410 mm$^{-2}$<br>$4^{th}$ order aspheric coefficient: −0.4297 mm$^{-4}$ |
| Lens surface 44B prescription | Radius of curvature: −0.3865 mm<br>Conic constant: −3.9636<br>$2^{nd}$ order aspheric coefficient: −0.2410 mm$^{-2}$<br>$4^{th}$ order aspheric coefficient: 0.4297 mm$^{-4}$ |

If optical system 41 is used to couple light 120 between identical optical fibers, then it is desirable that optical system 41 have unit magnification. However, optical system 41 need not have unit magnification. Magnifications other than unity can be achieved for example by using different radii of curvature for convex lens surfaces 42A and 44B.

An example where optical system 41 can have other than unit magnification is when the light source is an active light-emitting device such as a semiconductor laser and the light receiver is an optical fiber. Semiconductor lasers generally have a smaller cross section than an optical fiber core, and also generally have a greater divergence angle than the optical fiber acceptance angle. In such a case, optical system 41 can have a magnification larger than unity, with an example magnification being in the range from 1.5× to 3×.

Another example where optical system 41 can have other than unit magnification is where the light source is an optical fiber and the light receiver is a photodetector. Photodetectors generally have smaller cross section than an optical fiber core, and a greater acceptance angle than the divergence angle of the light beam emitted by the optical fiber. In such a case, optical system 41 can have magnification smaller than unity. With an example magnification being in the range from just under 1× to 0.33× (i.e., 1:3).

Another example where optical system 41 can have other than unit magnification is when coupling between dissimilar optical fibers or waveguides. In this case, optical system 41 can have a magnification larger than or smaller than unity, depending on the relative characteristics of the emitting and receiving optical fibers. It is noted that avoid substantial optical losses, the receiving optical fiber should have étendue equal to or greater than the étendue of the emitting optical fiber.

Also in an example, at least one of convex lens surfaces 42A and 44B is aspheric.

With reference to FIG. 1 through FIG. 4, in the operation of connector 10, light 120 is communicated from plug 12A to receptacle 12B. Light 120 is identified as light 120A when in plug 12A and as light 120B when in receptacle 12B. Thus, in an example, light 120A traveling in plug optical fiber 32A exits plug optical fiber end face 34A disposed substantially at focal plane PA and diverges as it passes through plug chamber 60A to plug lens 40A. In this regard, plug optical fiber end 34A acts as a light source. In embodiments described below, the light source is in the form of an active device, such as a light-emitting diode or a laser.

Divergent light 120A is then incident upon lens surface 42A and is substantially collimated thereby to form substantially collimated light 120A that travels substantially parallel to optical system axis A1 through plug lens 40A. Collimated light 120A then travels through angled and planar lens surface 44A and across gap 48 to angled and planar lens surface 42B of plug lens 40B, thereby forming substantially collimated light 120B.

There is some refraction of collimated light 120A as it passes through gap 48 due to angled and planar lens surfaces 44A and 42B. However, in the case where opposing angled and planar lens surfaces 44A and 42B are parallel and plug and receptacle lenses 40A and 40B are made of the same material, the light rays making up collimated light 120A and collimated light 120B are substantially parallel to one another and are only slightly displaced relative to each other. Note also that the angled and planar lens surfaces 44A and 42B have no optical power, which is advantageous with respect to contaminants that may be present in gap 48, as described in greater detail below.

Figure 11:
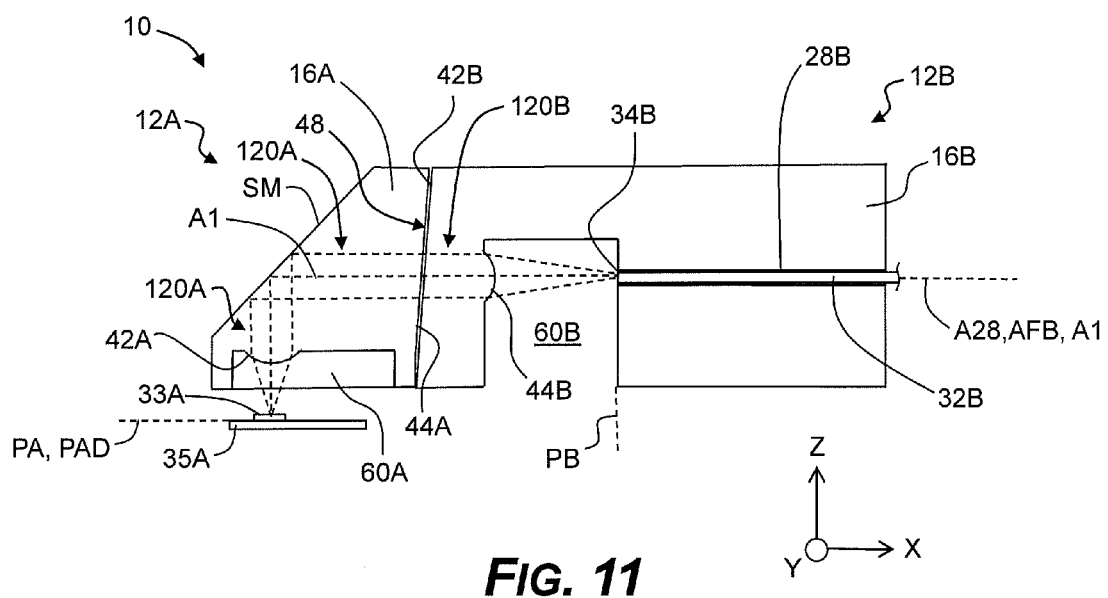
FIG. 11 is a longitudinal cross-sectional view of the unitary optical connector of FIG. 10.

Substantially collimated light 120B then travels through receptacle lens 40B to its convex lens surface 44B, where collimated light 120B is converted to converging light 120B, which converges onto receptacle optical fiber 32B at end face 34B located substantially at focal plane PB. In this sense, receptacle optical fiber end face 34B serves as an optical (light) receiver. In an example embodiment such as illustrated in FIG. 11, optical fiber end face 34B is replaced with an active device such as a photodetector.

In an example such as shown in FIG. 4, at least one of focal planes PA and PB is tilted relative to optical system axis A1, i.e., is not perpendicular to the optical system axis. Thus, in an example embodiment, at least one of optical fiber end faces 34A and 34B is tilted relative to optical system axis A1, i.e., at least one of optical fiber axes AFA and AFB is tilted relative to optical system axis A1 by an angle φ (see FIG. 4). Further in an example, at least one of optical fiber axes AFA and AFB is laterally shifted relative to optical system axis A1 by a distance LATA and LATB (as measured at optical fiber end faces 34A and 34B). In an example, at least one of optical fiber axes AFA and AFB is both tilted and shifted relative to optical system axis A1, such as illustrated in the example of FIG. 4.

Figure 5:
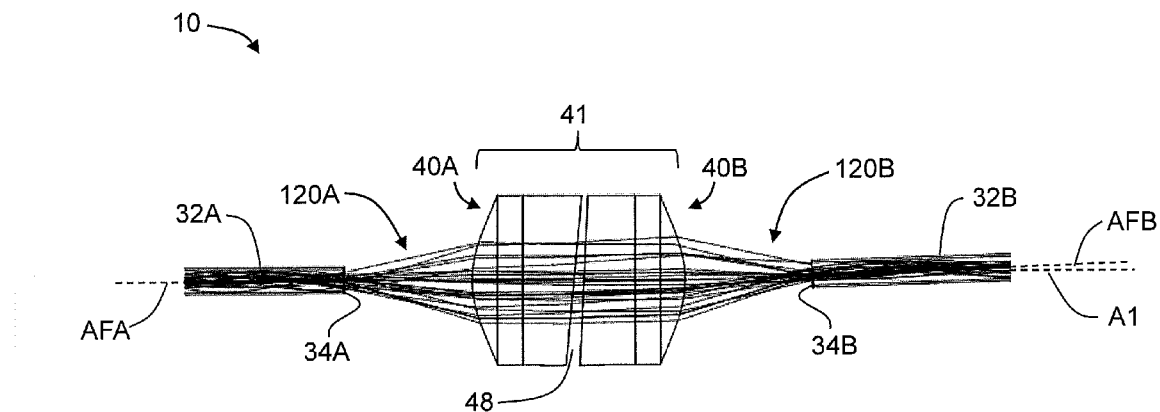
FIG. 5 is similar to FIG. 4 and shows an example path of light from the plug optical fiber to the receptacle optical fiber via the optical system when the gap between the planar lens surfaces is filled with air.
Figure 6:
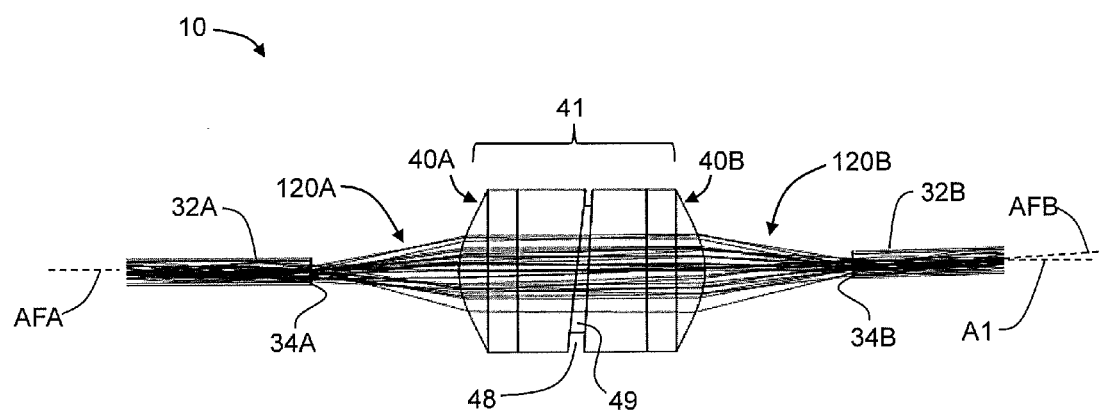
FIG. 6 is similar to FIG. 5, and illustrates an example where the gap is filled with fluid.

FIG. 5 is similar to FIG. 4 and shows the path of light 120 from plug optical fiber 32A to receptacle optical fiber 32B via optical system 41 when gap 48 is filled with air. FIG. 6 is similar to FIG. 5, and illustrates an example where gap 48 is filled with a fluid 49 in the form of water having a nominal refractive index $n_G=1.33$ at an operating wavelength of 850 nm. Notice that the path of light 120 remains substantially unchanged when fluid 49 is present. This is mainly because angled and planar lens surfaces 44A and 42B have no optical power. If lens surfaces 44A and 42B were to have optical power, then the presence of fluid 49 in gap 48 will act to reduce the optical power and substantially change the path of light 120, which can substantially reduce the amount of light 120B coupled into receptacle optical fiber 32B. Since angled and planar lens surfaces 44A and 42B have no optical power, the presence of fluid 49 in gap 48 generally has no substantial effect on light 120 passing through the gap.

Figure 7:
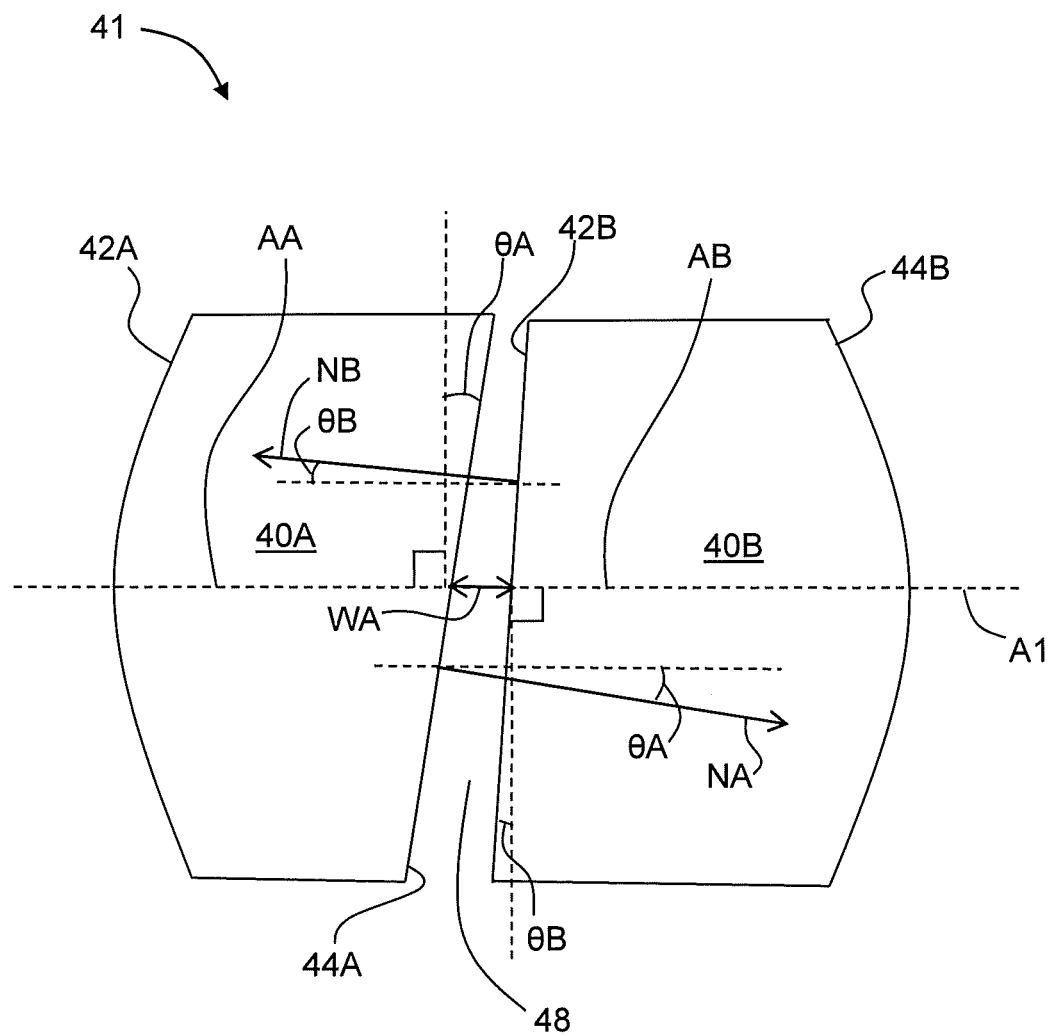
FIG. 7 is a close-up view of an example optical system of the optical connector showing the two angles θA and θB associated with respective angled, planar lens surfaces 42A and 44B.

FIG. 7 is a close-up view of an example optical system 41 formed by plug and receptacle lenses 40A and 40B, and shows an angle θA associated with angled and planar lens surface 44A of plug lens 40A and an angle θB associated with angled and planar lens surface 42B of receptacle lens 40B. Angles θA and θB are measured relative to a line perpendicular to optical system axis A1, and via geometry respectively represent the angles that lens surface normals NA and NB make relative to the optical system axis for respective angled and planar lens surfaces 44A and 42B.

In an example, angles θA and θB are selected to optimize the performance of optical connector 10, which in an example means at least one of maximizing the light coupling efficiency between the plug and receptacle optical fibers 32A and 32B, minimizing the amount of reflected light that can enter the plug and receptacle optical fibers, and minimizing the reduction in light coupling due to the presence of contaminants in gap 48. Reflected light that makes it back into plug optical fiber 32A can interfere with or otherwise impair normal operation of the original light source (not shown), and reflected light that enters receptacle optical fiber 32B can cause unwanted interference effects downstream, e.g., at a photodetector (not shown).

For optical connector 10 to be so optimized, angles θA and θB need to be sufficiently large to reduce or eliminate the adverse effects of light reflections from one or both of angled and planar lens surfaces 44A and 42B, yet also need to be sufficiently small so that the presence of contamination in gap 48 does not increase WA dramatically and cause light to arrive at receptacle fiber end 34B at an excessively large angle relative to receptacle fiber axis AFB so that it is unable to couple into receptacle fiber 32B.

The ranges for angles θA and θB depend on the specific optical system 10, such as the size and emission angle of the light source, the size and acceptance angle of the light receiver, and the focal lengths of plug lens 40A and receptacle lens 40B. For the example optical systems presented in Tables 1 and 2, angles θA and θB can be in the range from 2 degrees to 7 degrees, and have an absolute difference θA−θB in the range from 2 degrees to 4 degrees. It is also noted that angle θA can be larger or smaller than angle θB.

FIG. 5 shows an embodiment of optical system 41 where angle θA=6 degrees and angle θA=3 degrees. Lenses 40A and 40B are made of the same material, namely the aforementioned PEI, and have refractive indices $n_A=n_B=1.6395$ at a wavelength of 850 nm. Optical fibers 32A and 32B are multimode with core diameters $D_{CA}=D_{CB}=80$ microns and numerical apertures $NA_A=NA_B=0.29$.

Figure 8:
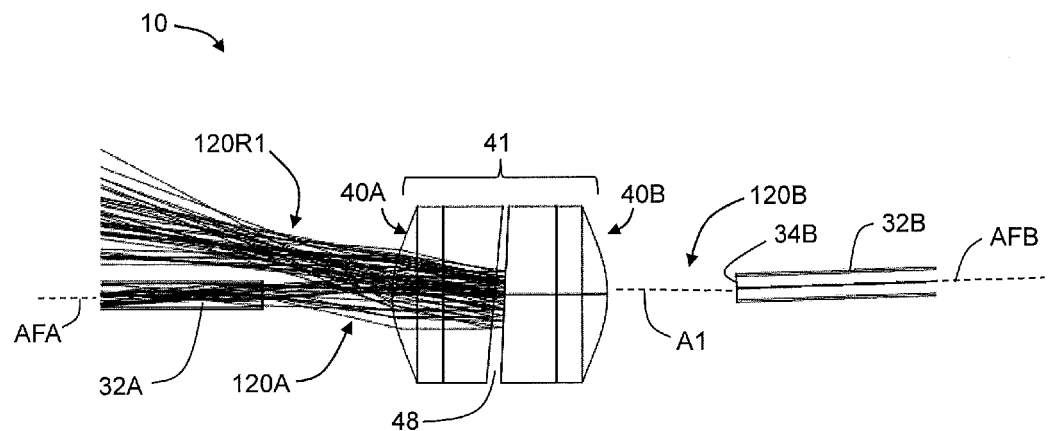
FIG. 8 is similar to FIG. 5, and shows light being reflected from the planar lens surfaces to form reflected light that travels back in the direction of plug optical fiber but that does not enter the plug optical fiber.

FIG. 8 is similar to FIG. 5, but shows light 120A being reflected from angled and planar lens surfaces 44A and 42B to form reflected light 120R1 that travels back in the direction of optical fiber 32A. However, the angles θA and θB of angled and planar lens surfaces 44A and 42B are selected such that light 120R1 does not enter optical fiber 32A.

Figure 9:
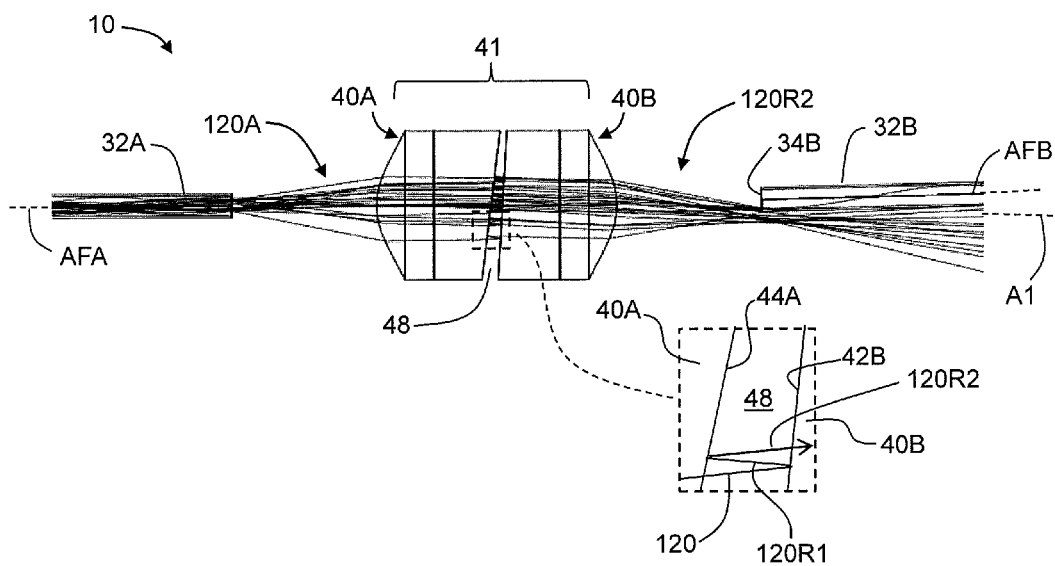
FIG. 9 is similar to FIG. 8 and shows an example where doubly reflected light from the planar lens surfaces heads in the general direction of the receptacle optical fiber does not enter the receptacle optical fiber in substantial amounts.

FIG. 9 is similar to FIG. 8 and shows an example where light 120A is first reflected by angled and planar lens surface 42A to form reflected light 120R1 and then reflected again by angled and planar lens surface 44B to form reflected light 120R2 that heads in the general direction of optical fiber 32B (see close-up inset). Because of the selection of angles θA and θB, the vast majority of the doubly reflected light 120R2 does not enter optical fiber 32B, thereby preventing undesired interference effects from reflected light.

FIG. 6, introduced above, shows light 120 passing from plug 12A to receptacle 12B when gap 48 is filled with a fluid having a refractive index $n_G=1.33$ at a wavelength of 850 nm. Thus, in an example, angles θA and θB are selected such that the performance of connector 10 is not substantially diminished even when a contaminant in the form of fluid 49 fills gap 48.

By way of example, consider fluid 49 in the form of water, which has a refractive index n=1.327 at an operating wavelength of 850 nm. Gap 48 can be sufficiently small so that fluid 49 that is ambient to optical connector 10 can be pulled into the gap via capillary action, thus filling gap 48. The presence of fluid 49 can change both the position and the angle of the light rays making up light 120 as the light travels through gap 48 and to optical fiber 32B.

As discussed above, optical connector 10 is configured such that the axial width WA of gap 48 is generally small. A small gap 48 ensures that the thickness of any liquid contaminants 49 that become trapped in the gap is also small, so that the optical attenuation of light 120 passing through the liquid contaminants is small. Thus, even if the liquid contaminant appears substantially opaque in general use, in thin layers the optical attenuation of such contaminants should be minimal. Also, many foodstuffs consumed in close proximity to computing devices are often water-based, so estimates of optical connector performance using water as a gap material are believed to representative of real-life experiences.

Example optical transmission values through 0.001 inch of example materials at wavelengths averaged over 800 nm to 859 nm are listed in Table 3 below. The listed materials constitute potential contaminants for the optical connector:

TABLE 3

Example Materials and Transmissions

| Material | Transmission (%) | Loss (dB) |
|---|---|---|
| Water | 99.7 | 0 |
| Ketchup | 82.6 | 0.8 |
| Sunscreen | 2.1 | 16.9 |
| Mustard | 4.6 | 13.3 |
| Hand Lotion | 50.7 | 3 |

In the example of FIG. 6, wherein θA=6 degrees and θB=3 degrees, substantially all of light 120B is coupled into optical fiber 32B even with gap 48 filled with fluid 49 in the form of water. As described above, this has mainly to do with the small gap width WA and the planar lens surfaces 44A and 42B not having optical power. Moreover, because fluid 49 has refractive index n>1, it reduces the reflection losses from planar lens surfaces 44A and 42B so that the presence of fluid 49 only slightly (i.e., insubstantially) degrades the coupling efficiency of optical connector 10, e.g., typically by less than about 0.2 dB.

Thus, in an example, angled and planar lens surfaces 44A and 42B have the following general properties when combined in forming optical system 41: they have no optical power that could be undesirably altered by the presence of contaminants in gap 48; they oppose one another and are spaced apart, and are angled with respective angles θA and θB measured relative to the optical system axis A1, with the angles being selected so that back reflection from either of the planar lens surfaces does not result in a substantial amount of reflected light 120R1 to be coupled back into optical fiber 32A or more generally, back toward the source of light 120A; Angles θA and θB are selected so that doubly-reflected light 120R2 is not coupled into optical fiber 32B; Angles θA and θB are selected so that the deviation and displacement of light 120 caused by presence of fluid 49 in gap 48 between the surfaces is acceptably small, i.e., at most results in an insubstantial change in the amount of light 120B coupled into optical fiber 32B.

Unitary Optical Connector

Figure 10:
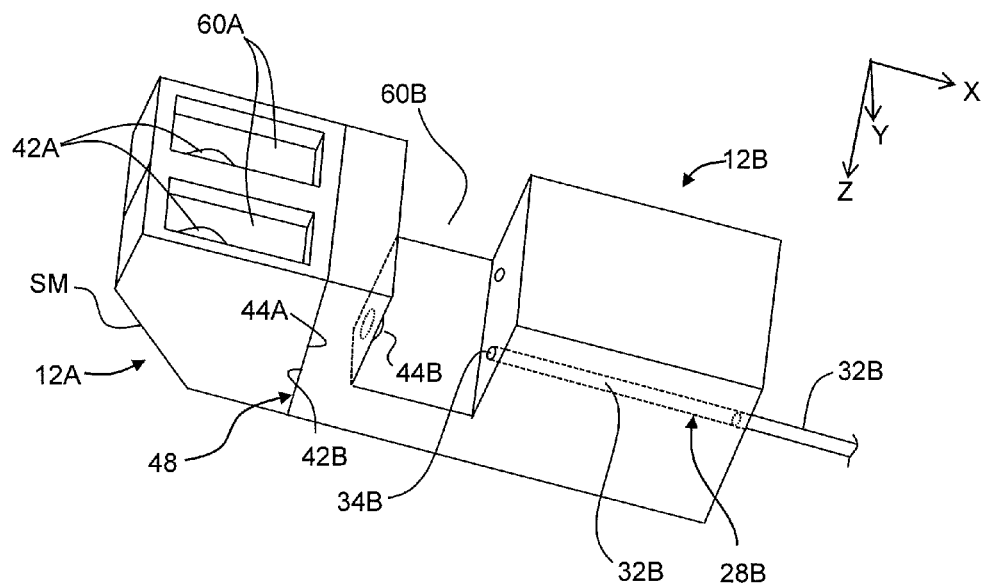
FIG. 10 is a bottom-up perspective view of an example unitary optical connector, with the plug and receptacles having a unitary structure, with the plug including a substantially right-angle bend.

FIG. 10 is a bottom-up perspective view of an example optical connector 10 ("unitary optical connector") wherein plug and receptacle 12A and 12B each have a unitary structure, with the plug having a substantially right-angle bend. FIG. 11 is a longitudinal cross-sectional view of the unitary connector 10 of FIG. 10. Cartesian coordinates are shown for reference in both FIG. 10 and FIG. 11.

Unitary optical connector 10 is well suited for providing optical coupling between at least one optical fiber 32B and a corresponding at least one active device 33A, such as a laser or a photodiode. An active device 33A is shown mounted to a motherboard 35A and lies in a plane PAD that is substantially perpendicular to the intersecting optical system axis A1. In an example, active device 33A is mounted on motherboard 35A in such a way that light 120A undergoes a substantially right-angle bend within plug 12A, as described below. Note that unitary optical connector 10 is suitable for connecting multiple optical fibers 32B to multiple other optical fibers 32A or to multiple active devices 33A, thereby creating multiple optical pathways between plug 12A and receptacle 12B.

With continuing reference to FIGS. 10 and 11, in an example, plug body 16A and receptacle body 16B each have a unitary structure formed by molding or machining. In another example, at least one of plug body 16A and receptacle body 16B is formed from multiple pieces. Also in an example, plug body 16A and receptacle body 16B are made of a material transparent to the operating wavelength of connector 10. An example material includes a transparent resin that transmits light 120 at one or more of the aforementioned optical telecommunications wavelength, such as 850 nm, 1310 nm and 1550 nm, or more generally at a wavelength the aforementioned operating wavelength range from about 850 nm to about 1600 nm. An example transparent resin is the aforementioned PEI, which has an index of refraction of 1.6395 at a wavelength of 850 nm.

Plug body 16A includes an angled surface SM oriented substantially at a 45 degree angle relative to optical system axis A1 so that the optical system axis is folded by substantially 90 degrees. Angled surface SM defines an internal mirror for plug body 16A that operates by total internal reflection and thus forms a substantially 90 degree bend in the general optical path of light 120A. In an example, convex lens surface 42A and planar lens surface 44A are part of plug body 16A and are formed integral therewith, e.g., via molding or machining Chamber 60A is formed as an open recess at a plug body end 15.

In an example, receptacle body 16B includes a bore 28B with an axis A28, where the bore is sized to accommodate optical fiber 32B. While FIG. 11 shows an example where axes A2, AFB and A28 are all co-axial, bore 28B may have a bore axis A28 that is not parallel to optical system axis A1 so that end face 34B of receptacle optical fiber 32B can be tilted relative to the optical system axis. Chamber 60B is shown formed as an open recess roughly in the center of receptacle body 16B, though the open recess can be formed more towards one end or the other of the receptacle body, as needed. Chamber 60B can also be formed as a closed chamber, which then allows for the chamber to be filled with a fluid. In an example, convex lens surface 44B and planar lens surface 42B are part of receptacle body 16B and are formed integral therewith, e.g., via molding or machining.

As in the previously described example optical connector 10, in an example unitary connector 10, lens surfaces 44A and 42B are angled and planar, and non-parallel i.e., are neither perpendicular to optical system axis A1 nor parallel to each other.

In the operation of unitary optical connector 10, divergent light 120A from a light-emitting active device 33A is emitted through chamber 60A towards convex lens 42, which forms substantially collimated light that travels through a portion of plug body 16A that is substantially centered around optical system axis A1. Collimated light internally reflects by substantially 90 degrees from angled surface (internal mirror) SM and travels towards planar lens surface 44A. Note that the portion of plug body 16A through which light 120A passes effectively defines lens 40A. Also, in this configuration, the plane PAD in which active device 33A resides is co-planar with focal plan PA and is substantially parallel to the folded portion of optical system axis A1 formed by angled surface SM and which passes through receptacle 12B.

Light 120A then passes through planar lens surface 44A and gap 48 and enters receptacle body 16B of receptacle 12B at planar lens surface 42B as light 120B. Light 120B then travels through receptacle body 16B as substantially collimated light until it reaches convex lens surface 44B. Convex lens surface 44B focuses the substantially collimated light 120B to form converging light 120B that travels through chamber 60B and converges onto optical fiber 32B at end face 34B, which is located at focal plane PB. Light 120B then travels in optical fiber 32B as guided light, and eventually exits receptacle 12B and travels on to its next destination, which may be another active device (not shown) such as a photodetector, or a passive device (not shown) such as another optical fiber.

Figure 12:
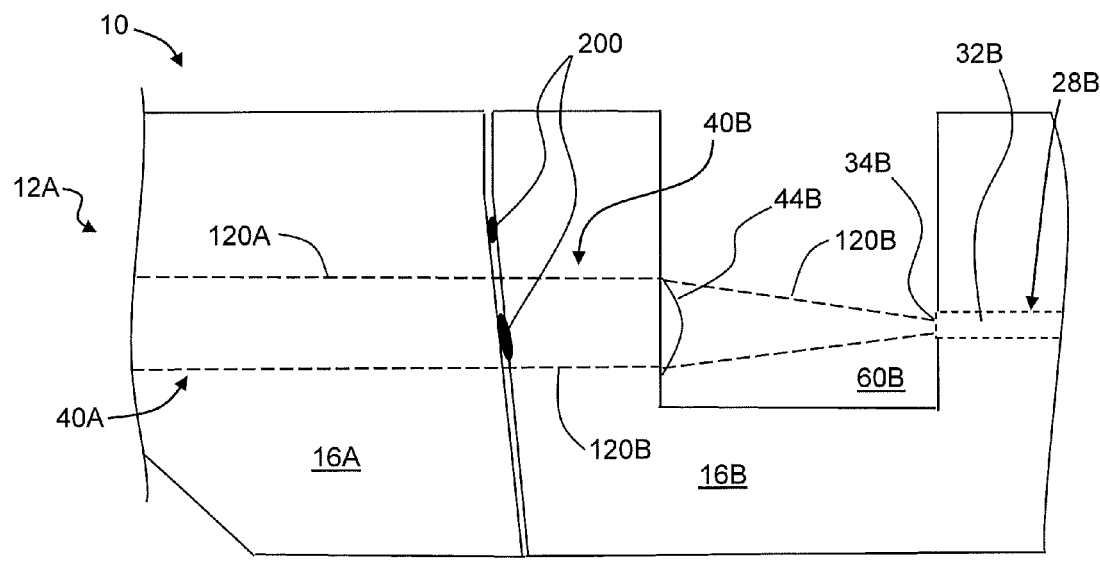
FIG. 12 is a close-up side cross-sectional view of the example unitary optical connector of FIG. 10, illustrating an example where debris resides in the gap between the planar lens surfaces.
Figure 13:
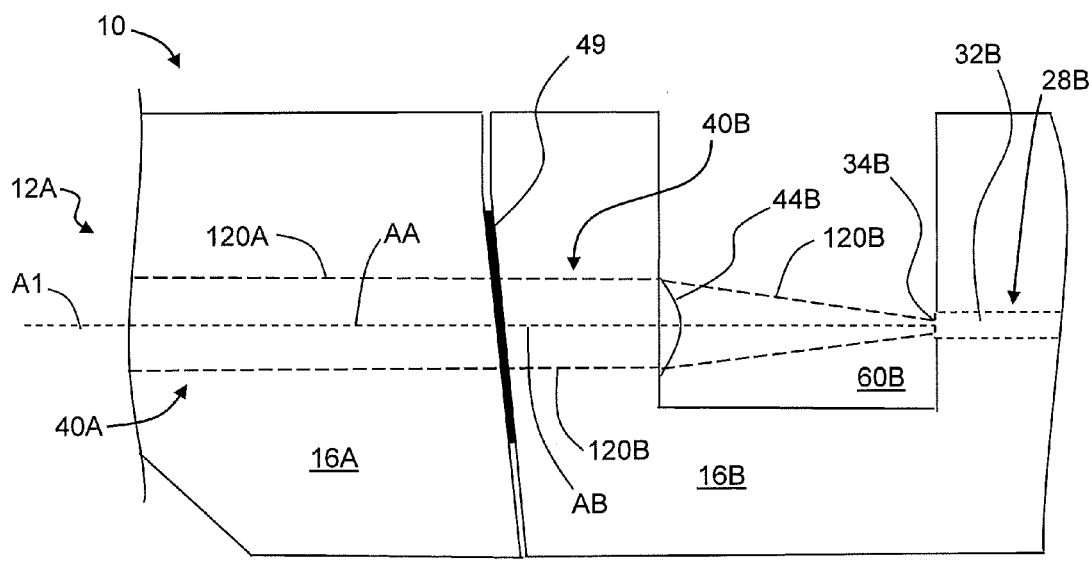
FIG. 13 is similar to FIG. 12 and illustrates an example where fluid resides in the gap between the planar lens surfaces.

FIG. 12 is a close-up side cross-section view of the example unitary optical connector 10 of FIGS. 10 and 11, illustrating an example where contamination in the form of pieces of debris 200 (e.g., dirt, grit, etc.) resides in gap 48. The presence of debris 200 does not result in substantial back reflection or interference effects, although some attenuation can occur for opaque debris. FIG. 13 is similar to FIG. 12 and illustrates an example where a fluid 49 resides in gap 48. As discussed above, the presence of fluid 49 does not substantially affect the performance of unitary connector 10 because of the relatively small gap width WA and because the angled and planar lens surfaces 44A and 42B have no optical power.

Optical system 42 of connector 10 of FIGS. 10 through 13 have the same general properties as set forth above, with the added property of a substantially 90 degree bend that facilities optical coupling with an active device 33A mounted in plane PAD, which in an example is substantially parallel to the portion of optical system axis A1 that passes through receptacle 12B.

The optical connector 10 disclosed herein is designed to provide optical coupling between a source of optical radiation (i.e., a light source) and a receiver of optical radiation (i.e., a light receiver). The source of optical radiation can be an optical waveguide (such as an optical fiber), or an active device that emits light, such as a laser. The receiver of optical radiation can be an optical waveguide (such as an optical fiber) or an active device that detects light, such as a photodiode. Optical connector 10 is generally configured to mitigate adverse performance effects caused by the presence of contaminants in gap 48, and in an example is optimized for maximum coupling efficiency while minimizing adverse effects from unwanted reflections.

GRIN Lens Embodiments

Figure 14:
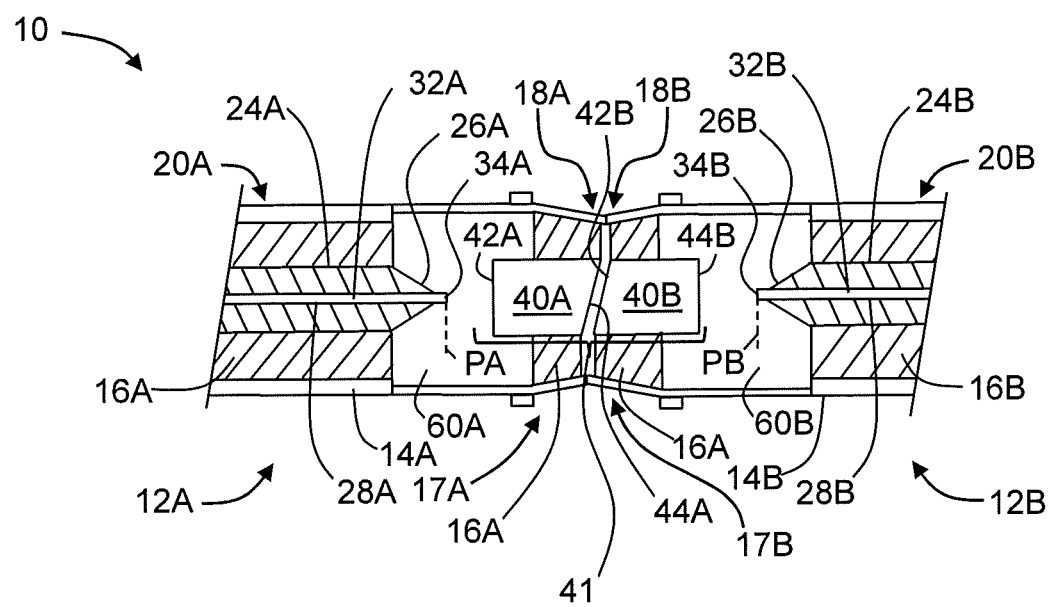
FIG. 14 is similar to FIG. 2 and illustrates an example embodiment wherein the plug and receptacle lenses are GRIN lenses.

FIG. 14 is similar to FIG. 2 and illustrates an example embodiment wherein plug lens 40A and receptacle lens 40B are GRIN lenses. For GRIN lenses 40A and 40B, lens surfaces 42A and 44A are planar and substantially perpendicular to optical system axis A1, while opposing lens surfaces 44A and 42B are as described above. Thus, rather than having the optical power at convex surfaces 42A and 44B (in combination with the respective lenses having uniform indices of refraction), the optical power resides within the volume of each lens 40A and 40B, wherein the refractive index varies radially, decreasing with distance from the respective lens axes AA and AB to provide each lens with the required positive optical power.

Thus, lenses 40A and 40B can be generally characterized as lenses having positive optical power, with the optical power originating from either a conventional plano-convex lens with a convex lens surface (42A and 44B, respectively) and angled planar surface 44A and 42B, or from the gradient index of refraction with the volume of each lens 40A and 40B, with the lens surfaces 42A, 44A, 42B and 44B all being substantially planar.

Figure 15:
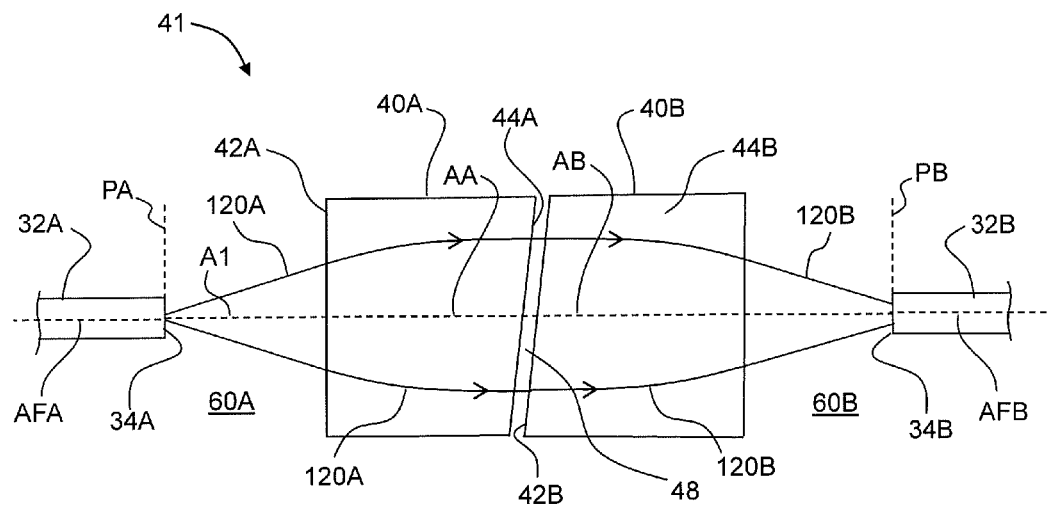
FIG. 15 and FIG. 16 are similar to FIG. 3 and FIG. 4 and illustrate example embodiments wherein the plug and receptacle lenses are GRIN lenses.
Figure 16:
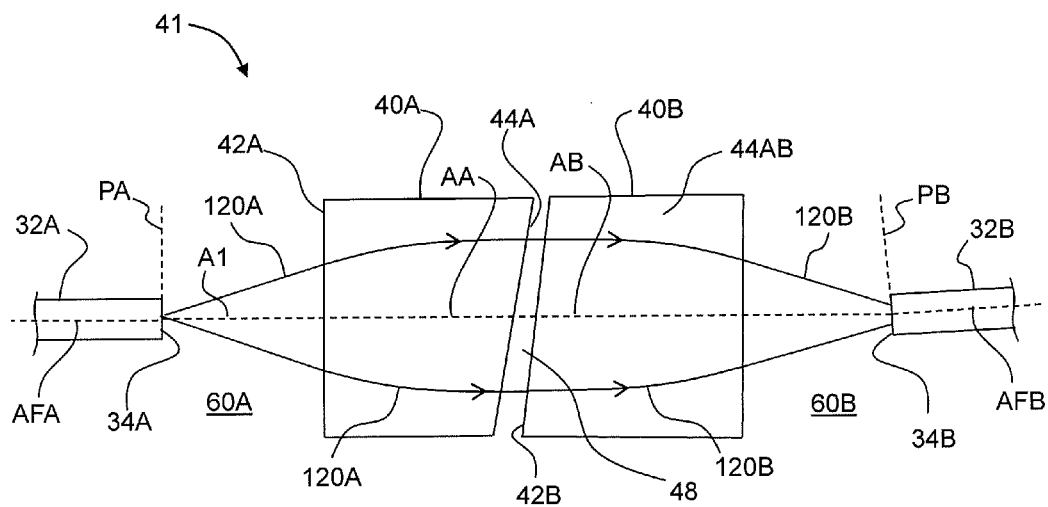

FIG. 14 and FIG. 15 are similar to FIG. 3 and FIG. 4 and show lenses 40A and 40B as GRIN lenses. The GRIN lenses 40A and 40B cause light 120 to follow a curved path through lenses 40A and 40B, with the light crossing gap 48 being substantially collimated, i.e., substantially parallel to optical axis A1.

Figure 17:
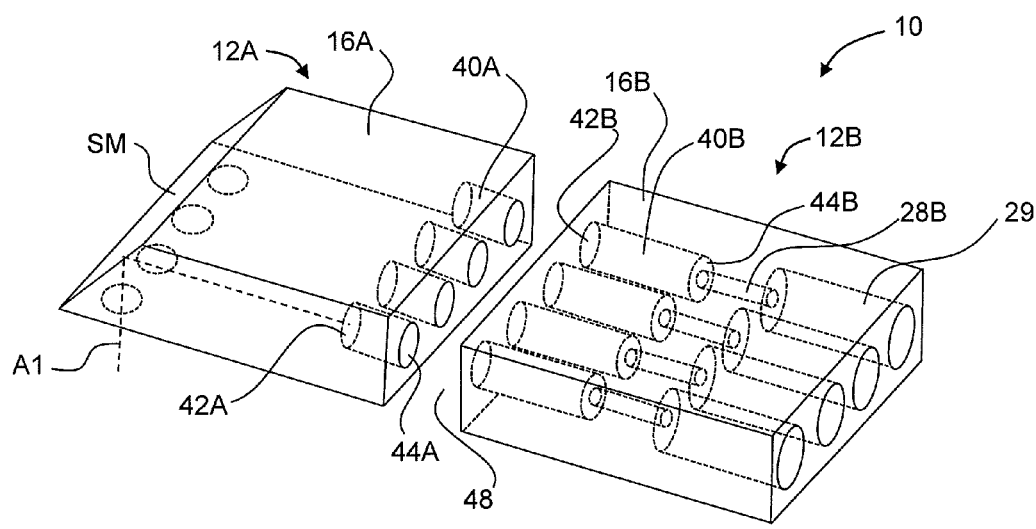
FIG. 17 is similar to FIG. 10 and illustrates a perspective view of an example embodiment of a unitary optical connector that includes GRIN lenses, with the elements internal to the unitary connector shown in phantom.

FIG. 17 is similar to FIG. 10 in that it illustrates a perspective view of an example embodiment of a unitary optical connector 10 that includes GRIN lenses 40A and 40B. The elements internal to plug 12A and receptacle 12B of unitary optical connector 10 of FIG. 17 are shown in phantom.

Figure 18:
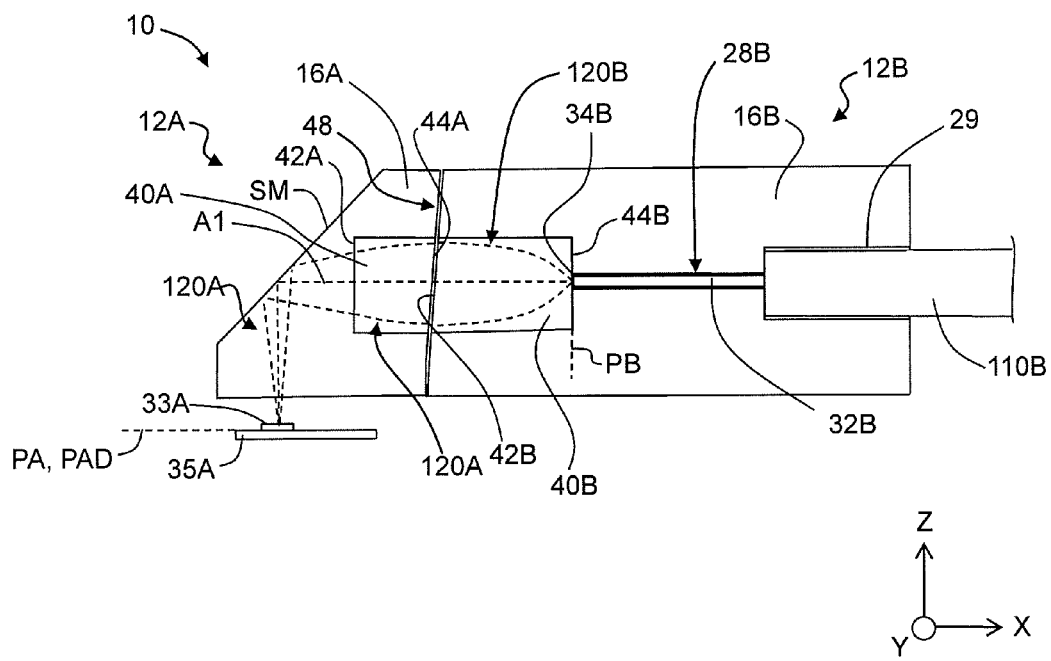
FIG. 18 is similar to FIG. 11 and shows a cross-sectional view of an example of the unitary optical connector of FIG. 17, with the unitary optical connector shown with a receptacle fiber optic cable residing in a fiber optic cable slot.

FIG. 18 is similar to FIG. 11 and shows a cross-sectional view of an example of the unitary optical connector 10 of FIG. 17. The unitary optical connector 10 of FIG. 18 is shown with a receptacle fiber optic cable 110B residing in a fiber optic cable slot 29 formed in receptacle body 16B.

The use of GRIN lenses 40A and 40B in unitary optical connector 10 obviates the need for chambers 60A and 60B, which are employed ostensibly in the non-GRIN embodiments described above to provide a volume having an index of refraction different from the lens so that light can converge or diverge therein after it enters or exits the lens. For a GRIN lens, such convergence and divergence occurs within the volume of the lens so that an adjacent volume with a different refractive index is not necessary. In an example, chamber 60 is used to provide a stand-off between active device 33A and plug body 16A.

In the example embodiment of FIGS. 17 and 18, GRIN lens 40A is disposed within a portion of plug body 16A. Thus, light 120 first travels through a portion of plug body 16A and then encounters lens 40A, which serves to substantially collimate the light at gap 48. GRIN lens 40B on the other hand has its rear planar surface 44B substantially in contact with optical fiber end face 34B, and light 120B converges as it travels through the volume of lens 40B from angled front surface 42B to the rear surface 44B. The focused light is then coupled into optical fiber end face 34B. In an example, there can be some space between rear lens surface 44B and optical fiber end face 34B so that light 120B need not come to a tight focus right at the rear lens surface but rather at a small distance beyond the rear lens surface.

An advantage of an optical connector 10 that uses an optical system with the above-described configuration lenses 40A and 40B (whether GRIN lenses, conventional lenses or a combination thereof) is that the plug and receptacle halves 12A and 12B of the optical connector are tolerant to a relative lateral displacement, i.e., the two halves can be laterally displaced without the optical connector experiencing a substantial optical loss. This tolerance is attractive for low-cost manufacturing of optical connector components.

Good alignment of plug 12A and receptacle 12B places planar surfaces 44A and 42B in their proper relative orientation. In an example, alignment of plug 12A and receptacle 12B is accomplished using one or more alignment features, such as alignment features 13A and 13B shown on optical connector 10 of FIG. 1. Example alignment features include indicia, flats, notches, etc. located around the perimeter of the connector at respective front ends 18A and 18B (see FIG. 2). Alternatively or in addition thereto, coaxial alignment features can be used, such as ferrule-in-tube alignment. The ferrule-in-tube approach has an advantage in that it preserves the angular alignment of flat surfaces 44A and 42B even when contaminants are introduced into gap 48, though it can complicate the optical connector design and extra care may be needed to completely clean critical connector alignment surfaces.

Although the disclosure has been illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the disclosure and are intended to be covered by the appended claims. It will also be apparent to those skilled in the art that various modifications and variations can be made to the present disclosure without departing from the spirit and scope of the same. Thus, it is intended that the present disclosure cover the modifications and variations of this disclosure provided they come within the scope of the appended claims and their equivalents.

What is claimed is:

1. An optical connector for optically connecting at least one light source to at least one light receiver at an operating wavelength, comprising:

first and second connector members respectively having a first front section with a first front end, a second front section with a second front end, at least one first positive-power lens with a first planar lens surface being closest to the first front end, and at least one second positive-power lens with a second planar lens surface being closest to the second front end; and the at least one first and at least one second lenses being arranged in their respective first and second connector members such that when the first and second connector members are operably mated, the at least one first and the at least one second lenses form at least one optical system where the first and second planar lens surfaces are opposing and spaced apart in opposition to form a gap having an axial width of about 25 microns to about 100 microns and are non-perpendicular to the optical system axis, the first planar lens surface forming a first angle relative to a line that is perpendicular to the optical system axis and the second planar lens surface forming a second angle relative to the line that is perpendicular to the optical system axis, the first angle and the second angle being non-equal such that an absolute difference between the first angle and the second angle is about 2 degrees to about 4 degrees.

2. The optical connector of claim 1, further comprising the at least one optical system having first and second focal planes, with the light source disposed substantially at the first focal plane and the light receiver disposed substantially at the second focal plane.

3. The optical connector of claim 2, wherein the first and second focal planes are non-parallel.

4. The optical connector of claim 2, wherein the light source includes a light source axis, the light receiver includes a light receiver axis, and wherein at least one of the light source and light receiver axes is at least one of angled and displaced relative to the optical system axis.

5. The optical connector of claim 2, wherein the light source includes a first optical fiber having a first end face from which light emanates.

6. The optical connector of claim 5, wherein the light receiver includes a second optical fiber having a second end face where the light from the light source is received via the optical system.

7. The optical connector of claim 6, further comprising the first and second optical fibers respectively supported by first and second ferrules.

8. The optical connector of claim 2, wherein the first and second angles minimize or eliminate an amount of light from the light source that is reflected from at least one of the first and second planar surfaces back to the light source.

9. The optical connector of claim 8, wherein the first and second angles minimize or eliminate an amount of light from the light source that is reflected from the planar surfaces and is received by the light receiver.

10. The optical connector of claim 1, wherein the operating wavelength is in a range from about 850 nm to about 1600 nm.

11. The optical connector of claim 1, further comprising one or more of:

the first optical power formed in the first lens from one of a first convex lens surface opposite the first planar lens surface and a first gradient index of refraction within the first lens; and the second optical power formed from one of a second convex lens surface opposite the second planar lens surface and a second gradient index of refraction within the second lens.

12. The optical connector of claim 11, wherein at least one of the first and second convex lens surfaces is aspheric.

13. The optical connector of claim 1, wherein first and second connector members are respectively formed as first and second unitary structures substantially transparent to the operating wavelength, wherein the first unitary structure defines the first lens and the secondary unitary structure defines the second lens.

14. The optical connector of claim 13, further comprising the first unitary structure having a substantially 45 degree angled surface that forms a substantially right-angle bend of the optical system axis via internal reflection.

15. The optical connector of claim 13, further comprising the first and second lenses having respective first and second focal planes, and the light source arranged at the first focal plane and the light receiver arranged at the second focal plane.

16. The optical connector of claim 13, further comprising:

the second unitary structure having a bore sized to accommodate at least one optical fiber; and the light receiver including an optical fiber arranged in the bore and having an end face disposed substantially at the second focal plane to receive light from the light source via the optical system.

17. The optical connector of claim 1, wherein at least one of the first and second lenses is formed from at least one material selected from the group of materials comprising: Polyetheremide, PolyMethylMethacrylate, glass, plastic, Silica/Germania glass, and MethylMethacrylate with Benzyl Methacrylate.

18. A method of forming an optical connection between at least one light source and at least one light receiver, comprising:

connecting a first connector member to a second connector member, with the first connector member having a first front section with a first front end, at least one first lens with a first positive power and a first planar surface being closest to the first front end; the second connector member having a second front section with a second front end, at least one second lens with a second optical power and a second planar surface being closest to the second front end, said connecting forming at least one optical system from the at least one first and at least one second lenses, with the first and second planar surfaces being opposing and spaced apart in opposition to form a gap having an axial width of about 25 microns to about 100 microns and angled to be non-perpendicular to an optical system axis, the first planar surface forming a first angle relative to a line that is perpendicular to the optical system axis and the second planar surface forming a second angle relative to the line that is perpendicular to the optical system axis, the first angle and the second angle being non-equal such that an absolute difference between the first angle and the second angle is about 2 degrees to about 4 degrees; and passing light from the at least one light source to the at least one light receiver via the at least one optical system.

19. The method of claim 18, further comprising the at least one light source having a first optical fiber and the at least one light receiver having a second optical fiber.

20. The method of claim 18, further comprising forming one or both of the first and second lenses to be a gradient-index (GRIN) lens.

21. The method of claim 18, further comprising the first and second connector members formed as first and second integral structures.

22. The method of claim 18, including configuring the first and second angles to minimize or eliminate light reflected from at least one of the first and second planar surfaces from either returning to the corresponding at least one light source or being received by the corresponding at least one light receiver.

23. The optical connector of claim 18, wherein the at least one light source includes a light source axis, the at least one light receiver includes a light receiver axis, and wherein at least one of the light source and light receiver axes is at least one of angled and displaced relative to the optical system axis.

24. An optical connector for communicating light of an operating wavelength from a light source to a light receiver, comprising:
  a first connector member having a first rear section and a first front section with a first front end, with a first lens disposed in the first front section, the first lens having a first positive optical power and a first planar surface facing the first front end, the first lens having a first focal plane and a first lens axis;
  a second connector member having a second rear section and a second front section with a second front end, with a second lens disposed in the second front section, the second lens having a second positive optical power and a second planar surface facing the second front end, the second lens having a second focal plane and a second lens axis; and
  wherein the first and second front sections are configured to matingly engage to form an optical system from the first and second lenses, wherein the optical system has an optical system axis defined by coaxial first and second lens axes, with the first and second planar surfaces being in opposition and spaced apart to form a gap having an axial width of about 25 microns to about 100 microns, and angled to be non-perpendicular to the optical system axis, the first planar surface forming a first angle relative to a line that is perpendicular to the optical system axis and the second planar surface forming a second angle relative to the line that is perpendicular to the optical system axis, wherein the first angle and the second angle are non-equal such that an absolute difference between the first angle and the second angle is about 2 degrees to about 4 degrees.

25. The optical connector of claim 24, wherein the first lens includes a first convex surface facing the first rear section and the second lens includes a second convex surface facing the second rear section.

26. The optical connector of claim 24, wherein the first and second lenses comprise gradient-index (GRIN) lenses.

27. The optical connector of claim 24, further comprising the light source disposed substantially at the first focal plane and the light receiver disposed substantially at the second focal plane.

28. The optical connector of claim 27, further comprising the first and second planar surfaces being configured to minimize or eliminate light reflected from at least one of the first and second planar surfaces from either returning to the light source or from being received by the light receiver.

29. The optical connector of claim 24, wherein the first and second connector members are respectively formed as first and second unitary structures substantially transparent to the operating wavelength, wherein the first unitary structure defines the first lens and the secondary unitary structure defines the second lens.

30. The optical connector of claim 24, wherein the first and second connector members are respectively formed as first and second unitary structures, with the first unitary structure transparent to the operating wavelength and supporting the first lens as a first gradient-index (GRIN) lens, and the secondary unitary structure supporting the second lens as a second GRIN lens.

31. The optical connector of claim 24, further comprising a first unitary structure having a substantially 45 degree angled surface that forms a substantially right-angle bend of the optical system axis.

\* \* \* \* \*